(12) United States Patent
Rolle et al.

(10) Patent No.: US 6,969,303 B1
(45) Date of Patent: Nov. 29, 2005

(54) METHOD AND COMPOSITION FOR REMOVING COATINGS WHICH CONTAIN HAZARDOUS ELEMENTS

(75) Inventors: Thomas C. Rolle, Dubuque, IA (US); James C. Wachtel, Dubuque, IA (US); Gary L. Tinklenberg, Lowell, MI (US)

(73) Assignee: Nextec, Inc., Dubuque, IA (US)

( * ) Notice: Subject to any disclaimer, the term of this patent is extended or adjusted under 35 U.S.C. 154(b) by 0 days.

(21) Appl. No.: 09/550,813

(22) Filed: Apr. 18, 2000

Related U.S. Application Data

(63) Continuation-in-part of application No. 08/832,958, filed on Apr. 4, 1997, now Pat. No. 6,089,955, which is a continuation-in-part of application No. 08/322,252, filed on Oct. 12, 1994, now Pat. No. 5,674,108.

(51) Int. Cl.$^7$ ................................. B24B 1/60
(52) U.S. Cl. ............... 451/38; 451/39; 451/87; 451/88
(58) Field of Search ............... 451/38, 39, 87, 451/88, 40, 37, 75, 90

(56) References Cited

U.S. PATENT DOCUMENTS

| | | | | |
|---|---|---|---|---|
| 6,037,469 A | * | 3/2000 | Broom et al. | ............. 544/48 |
| 6,147,115 A | * | 11/2000 | Crowell et al. | ............. 514/592 |
| 6,264,839 B1 | * | 7/2001 | Mohr et al. | ............. 210/687 |

* cited by examiner

*Primary Examiner*—Eileen P Morgan
(74) *Attorney, Agent, or Firm*—John A. Monocello, III, Esq.; Cohen & Grigsby, P.C.

(57) ABSTRACT

A method for removing a coating on a surface by applying a treatment composition layer to the coating to be removed. The treatment composition layer is made up of (Is) a first material selected from the compounds of sodium and potassium silicates, sodium and potassium phosphate, calcium silicate, iron and aluminum sulfates. An abrasive is injected against the coating to be removed so that the treatment composition layer and coat to be removed are removed and any hazardous material in the layer to be removed is contained.

6 Claims, No Drawings

METHOD AND COMPOSITION FOR REMOVING COATINGS WHICH CONTAIN HAZARDOUS ELEMENTS

RELATED APPLICATION

This is a continuation-in-part application of U.S. patent application Ser. No. 08/832,958, filed Apr. 4, 1997 U.S. Pat. No. 6,089,955, which is a continuation-in-part of Ser. No. 08/322,252 filed Oct. 12, 1994 U.S. Pat. No. 5,674,108, entitled Method For Removing Coatings which Create Hazardous Byproducts.

FIELD OF INVENTION

The present invention relates to a composition and method for removing coatings containing hazardous metals or organic material from the surface of metals and non-metals and, in particular, compositions for use with methods for removing such coatings and rendering the removal material a non-hazardous waste byproduct and minimizing the exposure of the waste byproduct to the environment. Additionally, the invention relates to the application of treatment materials to wastes that are to be disposed of with the hazardous coating intact.

BACKGROUND OF THE INVENTION

It is well known that coatings used on metals and non-metals often contain various hazardous and toxic substances. When these coatings are removed or begin to fall off, the offending hazardous and toxic substances can create a risk to the environment and to humans exposed through work and living environments. This is especially the case in the abrasive, mechanical and chemical removal of paint coatings such as the sand blasting of lead-based painted steel structures, the use of power tools on all types of surfaces or the use of chemical strippers. Additionally, abrasive or mechanical removal systems create a considerable amount of dust along with the paint waste generated. Both the dust and the wastes can contain the hazardous and toxic substances. Workers and the environment must be shielded from the waste and the dust through expensive containment systems and hazardous waste disposal procedures. The U.S. Environmental Protection Agency has included many of the ingredients of coatings, such as heavy metals, as hazardous substances which then become regulated waste material when removed. These wastes include heavy metals such as chromium, silver, lead, arsenic, barium, cadmium, selenium, mercury, zinc and others as well as polyvinyl chlorides, PCB, 2BHC and like toxins.

In many of the known removal processes, the hazardous substances create troublesome disposal and handling problems. Consequently, various types of systems have been devised to reduce, minimize or eliminate the hazard posed by coatings both in place and as wastes when removed. For example, vacuum recyclable abrasive blasting systems provide a closed loop in which a positive pressure and a variable recycling system provide good removal. Typically, steel or iron, grit or shot are used as the operative abrasive. A negative pressure or vacuum is applied to a hose positioned against the surface on which the coating to be removed is located and which collects the spent abrasive and removed coating with minimal exposure to the atmosphere. The collected wastes and reusable abrasives are separated through known separation techniques.

Nonvacuum removal techniques require the containment and collection of the spent abrasive and paint waste to prevent environmental exposure. Containment, dust control and waste minimization activities are time consuming and expensive. In both methods, disposal of the waste is a significant problem.

In some cases, it is determined that managing a coating in place is more cost effective in the short term. In such cases, an encapsulant or over-coating is used to immobilize a peeling or chipping surface. The encapsulant acts to overcoat and bind any chipping or peeling paint to the substrate and prevent any of the toxic or hazardous elements from entering the environment. The encapsulant process does not remove or abate the deteriorating coating. Rather, it manages the problem in place to be dealt with at a later time. The hazardous or toxic elements are still present and will represent a disposal problem at a later time.

Many times architectural components are removed in their entirety. The components (such as door frames, windows, moldings, etc.) when tested in accordance with EPA procedures, and if painted with lead based paint, often result in the components being a hazardous waste. The treatment of this waste is so complicated and expensive that the EPA is considering granting an exemption from the hazardous waste regulations. This would allow great quantities of materials to be placed in non-hazardous waste landfills completely untreated. This present invention provides an economical method for rendering such wastes non-hazardous.

One method of treating solid hazardous waste containing unacceptable levels of leachable metals is set forth in U.S. Pat. No. 5,037,479 in which the solid waste is mixed with a buffering agent such as magnesium oxide or hydroxide and a salt or acid such as triple superphosphate, ammonium phosphate or diammonium phosphate. The method provides a way of converting hazardous wastes to a substantially nonleachable form. See also U.S. Pat. No. 4,889,640 for a similar method of treating hazardous wastes and Methods to Treat EP Toxic Foundry Wastes and Waste waters, AFS Transactions, 1985, p. 737–740. See also U.S. Pat. Nos. 5,266,122 and 5,439,527.

Accordingly, it is an object of the present invention to provide compositions and methods for their application to remove coatings that include a hazardous substance and prevent the removed waste from becoming a hazardous byproduct. It is a further objective of the invention to provide a method that facilitates compliance with the requirements of the various agencies regulating environmental exposure to hazardous substances. It is a further objective to provide a removal method and compositions for use therein which facilitates the handling and disposal of any waste in a manner which renders it exempt from regulation and which is both cost effective and practical to use.

SUMMARY OF THE INVENTION

Generally, the present invention provides compositions and methods using such compositions for the removal of coatings and surface materials from metals and nonmetal surfaces or the treatment of components to be disposed of in their entirety. In one embodiment, the method comprises applying a treatment or surface preparation system in the form of an application layer to the surface coating to be removed prior to the removal process. In another embodiment the treatment composition can be added simultaneously either wet or dry with a separate hose along with an abrasive. Additionally, the treatment or surface preparation layer can be applied simultaneously with a chemical stripper or encapsulant so that the reaction to render the waste non hazardous for heavy metals can take place when the waste is generated.

The treatment composition preferably comprises at least one compound selected from the group of alkali metal or alkaline earth metals and the silicates, phosphates, sulfates and oxides or hydroxides of alkali metals or alkaline earth metals and like materials. In one of the preferred embodiments the treatment composition is applied as a surface layer of the material to be removed with a thickness of from about 1 mil to approximately 100 mils at a viscosity of 25 to 640 stormer seconds. The thickness of the surface layer is related to the composition of the coating to be removed as well as the ratio of treatment material in the treatment coating. For example, a lesser amount of treatment material is required with a removal means-such as a needle gun than with abrasive blasting because there is less volume of waste generated. Also, the higher ratio of active treatment material to solvent the thicker the coating. In a number of cases, it has also been found desirable to add a buffering agent to the treatment to maintain the pH of the resulting waste.

The treatment composition layer is removed abrasively, mechanically or with a chemical stripper together with the coating or surface sought to be removed. The treatment layer can also be applied to the surface of an object and the entire object can be disposed of as a non-hazardous waste. The treatment composition layer can also be incorporated into an encapsulant or over-coating and managed in place. The treatment composition renders hazardous material due to leachable heavy metals contained in the coating a non-hazardous waste. Generally, any type of removal equipment can be used including abrasives, power tools, chemical strippers, scrapers, brushes, high pressure water and automatic preparation and removal systems. The treatment composition can be either dry or wet during removal.

In the process of mechanical separation using recyclable abrasives, the reusable abrasive is mixed with constituents from the removed coating. The surface treatment reacts with any hazardous elements from the coating mixed with the abrasive and renders the waste produced non-hazardous as defined by EPA regulations [Toxicity Characteristic Leaching Procedure]. The surface preparation coating is removed during the abrasive recycling process and is incorporated into the waste. The clean abrasive is than ready for reuse.

The process of the present invention facilitates the removal and separation of old coatings containing hazardous and toxic substances from the surface and prevents the offending elements from entering the environment. More importantly, the invention provides an easy disposal process since the waste generated is not subject to regulation and will not require chemical treatment prior to disposal. Other advantages of the present invention will become apparent from a perusal of the following description of presently preferred embodiments of the invention.

PRESENTLY PREFERRED EMBODIMENTS

The presently preferred embodiment of the invention comprises applying to the surface, a layer formed by the treatment composition that is removed together with the old coating. The compositions of the present invention comprise at least one compound selected from the group of alkali metal or alkaline earth metal or portland cement and/or phosphates, sulfates, silicates, oxides or hydroxides of alkali metals or alkaline earth metals and like materials. In particular the following components have been found particularly useful as the treatment composition of the present invention. These materials can be used alone or in combination with each other as well as with solvents, resins and surfactants. The preferred compounds comprise:

Sodium Silicate Diammonium Phosphate
Sodium Metasilicate Dicalcium Phosphate
Sodium Orthosilicate Dipotassium Phosphate
Ferric Sulfite Monocalcium Phosphate
Phosphate Rock Dicalcium Phosphate
Potassium Silicate Tricalcium Phosphate
Aluminum Sulfate Trisodium Phosphate
Tricalcium Aluminate Alum
Sodium Metabisulfite Ferrous Sulfate
Metallic Iron Ferric Sulfate
Silicate of Soda Tricalcium Silicate
Soda Ash (Sodium Carbonate) Dicalcium Silicate
Caustic Potagh (Potassium Hydroxide) Ferrous Oxide
Phosphoric Acid Calcium Phosphate
   Calcium Carbonate
   Polythio Carbonates Additional treatment composition compounds can be selected from the family of Pozzolans such as natural Pozzolans, including Rhenish Trass, Bavarian Trass, Santorian Earth, Rumanian Trass, Crimean Turf, U.S.A. Rhyolltic, Pumicite, and artificial Pozzolans, including Burnt Clay, spent oil shale, Raw Gaize, Raw Moler, Raw Diatomite, Burnt Diatomite, and Fly Ash or Phosphate rock. Also preferred are Portland cements of types I–V (ASTM C 150). These can be used in various mesh sizes and grades compatible with the methods of application used. Binary and tertiary compounds of cements are effective in the present invention. Also, cement kiln dusts can be effectively used in the present invention. Preferred compounds are such Tricalcium silicate, Calcium Hydroxide, Silicon Dioxide, Aluminum Oxide, Ferric Oxide, and the Phosphate families, Sulfate families, Sulfite families, and Silicate families. In addition, clays such as Bentonite, Ilite, and Attapulgite are useful.

Preferred solvents include aliphatic and aromatic hydrocarbons such as hexane, heptane, mineral spirits and toluene, xylene and Barsol, alcohols, e.g., n-butanol esters such as ethyl acetate, butyl acetate, dibasic esters; glycol ethers; ketones such as acetone, MEK, MEP; chlorinated solvents, e.g., methylene chloride, trichloroethylene; glycols such as propylene glycol, ethylene glycol and the like. Also, water is used in many coatings.

Generally, the following examples set forth broad groups of treatment compositions. These compositions are useful in the novel methods of the present invention.

Example I

A mixture containing calcium silicate or portland cement, magnesium oxide; tri sodium phosphate, resins, surfactants and either hydrocarbon solvents or water to produce a paintable treatment composition. The solids are preferably present in a ratio 10:0:0 to 0:0:1 and preferably about 7:1:0.2. The former ratio is useful in spray coating architectural elements which have a hazardous material contained in the coating. This is useful in overcoating for disposal of such elements. Solvents such as naphtha, acetone, toluene or water can be used. This composition is the preferred vehicle for application to the surface coating to be removed or component to be discarded. Various grades, compositions and ratios of alkaline earth metals, alkali metals, resins and surfactants, solvent or water can be used. The ratios and selection of stabilizing material and active material depend on the coating to be removed and can be adjusted. For example, iron sulfate can be preferentially added when chrome is present.

Example II

In another embodiment, magnesium hydroxide, tri sodium phosphate and potassium silicate and solvents are mixed to form a treatment composition. The resulting composition functions as a chemical paint stripper that removes an old coating and also reacting with the waste and rendering the resultant waste non hazardous for leachable lead. The compositions of the present invention provide non-leachability of the heavy metals contained in the stripped coating.

Example III

Mono calcium phosphate and magnesium oxide are mixed in conjunction with a standard encapsulant (such as water based acrylic elastomerics) that can be applied to surfaces and left in place to prevent chipping and peeling. When the encapsulant and underlying coating are removed, the waste will test nonhazardous for disposal.

Example IV

A composition consisting of calcium oxide and tri sodium phosphate was applied as a slurry in conjunction with a water blasting system in which water was used as the abrasive.

In addition to the foregoing, the following formulations provide very usable coatings:

Example V

| | |
|---|---|
| Potassium Silicate | 5 parts |
| Portland Cement | 2 parts |
| Magnesium Oxide | 5 parts |
| Magnesium Hydroxide | 9 parts |
| Water | 20–24 parts |

Example VI

| | |
|---|---|
| Monocalcium Phosphate | 5 parts |
| Portland Cement | 6 parts |
| Magnesium Oxide | 5 parts |
| Magnesium Hydroxide | 9 parts |
| Water | 32 parts |

Example VII

| | |
|---|---|
| Potassium Silicate | 5 parts |
| Portland Cement | 2 parts |
| Magnesium Oxide | 5 parts |
| Magnesium Hydroxide | 9 parts |
| Water | 8 parts |
| Oil | 8 parts |
| Vegetable surfactant | 0.5 parts |

Example VIII

| | |
|---|---|
| Potassium Silicate | 5 parts |
| Portland Cement | 6 parts |
| Magnesium Oxide | 5 parts |
| Magnesium Hydroxide | 9 parts |
| Water | 30 parts |
| Surfactant | 2 parts |

Example IX

Magnesium oxide and calcium phosphate are mixed with N-methyl pyrrolidone, dimethyl glutarate, dimethyl adipate, toluene, acetone, MEK, sodium hydroxide, methanol, or ethyl 3 ethoxypropionate in varying ratios along with thixotropes and wax sealers to create a chemical stripper that will remove paint and render any waste generated non-hazardous.

Example X

Magnesium oxide and calcium phosphate are mixed with a moisture cure urethane, epoxy or alkyd paint system to form an overcoating that will render waste non-hazardous when removed in the future.

The present invention provides compositions that react with the metal and the surrounding material to prevent hazardous metals such as lead in a waste generated during a paint removal or discarding process from being classified a hazardous waste. The hazardous metals constituents are thus stabilized into a form resistant to leaching.

Examples of the type and amount of surface preparation chemistry used in the removal process are normally categorized based on the amount and type of offending elements in the coating to be removed. Generally, the wastes are categorized around the presence of leachable heavy metals in the coating. The hazardous elements are usually found in paints and other protective coatings. The amount of hazardous material in the waste is determinative as to whether the waste complies with the EPA regulations through the TCLP test.

In another presently preferred embodiment, compositions of the present invention are mixed with abrasives and directly ejected onto the surface to be treated. It is preferred that the abrasive be a nonliquid. In addition, the composition is preferably selected from calcium and potassium silicate or portland cement types I to IV and one of sodium, calcium or potassium phosphate, calcium silicate, iron and aluminum sulfate.

Illustrative of the process of the invention: Calcium phosphate pellets are mixed with a standard abrasive in the amount of 5–35% by weight and ejected onto a surface to remove coatings and render the waste non-hazardous.

Example A

The following tests were performed using the composition of the present invention mixed with an abrasive. Three samples were tested. An abrasive without the composition, abrasive+10% composition and abrasive+5% composition. Abrasive Sixteen pounds of garnet abrasive was used to blast 4 square feet of surface area. All the spent abrasive and removed paint was collected and tested for leachable lead using EPA procedures.

Abrasive+10%. Similar to the test without, except that 10% of the active ingredients of composition were added to the abrasive.

Abrasive+5% Similar to the test without, except that 5% of the active ingredients of composition were added to the abrasive.

The results are set forth in Table I.

TABLE I

| Sample Identification | Element | Result | Maximum Allowable Limit | Operating Detecting Limit |
|---|---|---|---|---|
| Abrasive | Lead | 43 ppm | 5.0 ppm | 0.2 ppm |
| Abrasive + 10% | Lead | *BDL | 5.0 ppm | 0.2 ppm |
| Abrasive + 5% | Lead | *BDL | 5.0 ppm | 0.2 ppm |

Example B

Paint was removed from a typical bridge coated with lead based paint. The lead content of the paint on the bridge was 36% (360,000 PPM). The paint was removed with a needle gun from two areas, one that was treated with 40 mils wet of a composition such as described in Example I and one which had no treatment whatsoever.

The waste generated from the composition of the invention treated areas leached (TCLP Method 1311) lead at 0.75 PPM while the untreated area leached lead at 35 PPM.

Paint was also removed using abrasive blasting techniques. Paint was removed using typical production equipment and pressures. The abrasive was garnet at 4 pounds per square foot. The paint was blasted from two areas, one with no treatment and one which had been coated with 40 mils (wet) of a composition such as described in Example I. The waste generated from the treated areas leached (TCLP Method 1311) lead below the detection limit 0.2 PPM (BDL) while the untreated area leached at 40 PPM.

Example C

Samples of various architectural components (doors, window frames, trim, etc.) were removed from housing units on a United States Coast Guard base. The components were covered with paint that leached at 20 PPM and higher (TCLP Method 1311).

The same components were treated with the coating and returned with leachability results of 1.5 PPM and lower.

While presently preferred embodiments of the invention have been described in particularity, the invention may be otherwise embodied within the scope of the appended claims.

What is claimed is:

1. A treatment material for admixture with a paint stripper or for use in a method for removing a coating, said coating having a hazardous metal or compound contained therein, said treatment material comprising:
   a. a combination of:
      i. an alkali metal silicate or alkaline earth metal silicate or alkaline earth metal silicate oxide or portland cement,
      ii. an alkali metal or alkaline earth metal phosphate, and
      iii. an oxide or hydroxide of a magnesium, aluminum, iron, potassium or sodium,
      wherein said combination is present in a ratio ranging from 10:0.01:0.01 to 0.01:1:1 respectively; and
   b. a solvent in an amount up to about 55% by total weight of the treatment material, wherein said solvent is selected from water, aliphatic hydrocarbons, aromatic hydrocarbons, alcohols, esters, glycol ethers, ketones, chlorinated solvents and glycols.

2. A treatment material for admixture with a paint stripper or for use in a method for removing a coating, said coating having a hazardous metal or compound contained therein, said treatment material comprising:
   a. a combination of:
      i. an alkali metal silicate or alkaline earth metal silicate or alkaline earth metal silicate oxide or portland cement,
      ii. an alkali metal or alkaline earth metal phosphate, and
      iii. an oxide or hydroxide of a magnesium, aluminum, iron, potassium or sodium,
      wherein said combination is present in a ratio ranging from 10:1:0.2 to 7:1:0.5 respectively; and
   b. a solvent in an amount up to about 55% by total weight of the treatment material, wherein said solvent is selected from water, aliphatic hydrocarbons, aromatic hydrocarbons, alcohols, esters, glycol ethers, ketones, chlorinated solvents and glycols.

3. A treatment material as set forth in either claim 1 or claim 2 including a resin and surfactant compatible with said solvent.

4. A treatment material for use with an encapsulant or overcoating comprising:
   a) a combination of:
      i. an alkali metal silicate or alkaline earth metal silicate or alkaline earth metal silicate oxide or hydroxide or portland cement; and
      ii. an alkali metal or alkaline earth metal phosphate wherein said combination is present in a ratio ranging from 10:0.01 to 0.01:1 respectively, and
   b) a solvent in an amount up to about 55% by total weight of the treatment material, wherein said solvent is selected from the group consisting of water, aliphatic hydrocarbons, aromatic hydrocarbons, alcohols, esters, glycol ethers, ketones, chlorinated solvents and glycols.

5. A treatment material for use with an abrasive in removing coatings, said coatings having a hazardous metal or compound contained therein, said treatment material comprising:
   a. a combination of:
      i. an alkali metal silicate or an alkaline earth metal silicate or a portland cement; and
      ii. sodium, calcium phosphate, potassium phosphate, calcium silicate, iron sulfate, or aluminum sulfate,
      wherein said combination is present in a ratio of 10:0.01 to 0.01:1 respectively, and
   a solvent in an amount up to about 55% by total weight of the treatment material, wherein said solvent is selected from the group consisting of water, aliphatic hydrocarbons, aromatic hydrocarbons, alcohols, esters, glycol ethers, ketones, chlorinated solvents and glycols.

6. A treatment material comprising:
   a) magnesium oxide and calcium phosphate, said magnesium oxide and calcium phosphate mixed in a paint system comprising one of the following: an alkyd, epoxy, acrylic, elastomeric or urethane; and
   b) a solvent in an amount up to about 55% by total weight of the treatment material, wherein said solvent is selected from the group consisting of water, aliphatic hydrocarbons, aromatic hydrocarbons, alcohols, esters, glycol ethers, ketones, chlorinated solvents and glycols.

* * * * *